(12) United States Patent
Irlbacher

(10) Patent No.: US 6,695,334 B2
(45) Date of Patent: Feb. 24, 2004

(54) BICYCLE

(75) Inventor: Konrad Irlbacher, Rohrdorf (DE)

(73) Assignee: IKO-Sportartikel-Handels-GmbH, Raubling (DE)

(*) Notice: Subject to any disclaimer, the term of this patent is extended or adjusted under 35 U.S.C. 154(b) by 0 days.

(21) Appl. No.: 10/163,644

(22) Filed: Jun. 7, 2002

(65) Prior Publication Data
US 2002/0185836 A1 Dec. 12, 2002

(30) Foreign Application Priority Data
Jun. 7, 2001 (DE) .......................... 101 27 614
Jan. 31, 2002 (DE) .......................... 402 00 975

(51) Int. Cl.[7] .............................................. B62K 1/00
(52) U.S. Cl. ................................ 280/278; 280/287
(58) Field of Search ............................. 280/287, 278, 280/281.1, 87.05

(56) References Cited

U.S. PATENT DOCUMENTS

| 3,979,136 A | | 9/1976 | Lassiere | |
| 4,460,191 A | * | 7/1984 | Ishibashi et al. | 280/287 |
| 4,634,138 A | * | 1/1987 | Fryer et al. | 280/278 |
| 4,824,130 A | | 4/1989 | Chiu | |
| 5,492,350 A | * | 2/1996 | Pan | 280/278 |
| 5,899,481 A | * | 5/1999 | Ferrarin | 280/287 |
| 5,975,551 A | * | 11/1999 | Montague et al. | 280/287 |
| 6,196,566 B1 | * | 3/2001 | Zhang | 280/287 |
| 6,354,618 B1 | * | 3/2002 | Liao | 280/287 |
| 6,425,598 B2 | * | 7/2002 | Murayana | 280/278 |
| 6,595,536 B1 | * | 7/2003 | Tucker | 280/278 |

FOREIGN PATENT DOCUMENTS

| DE | 81 24 880 | 5/1982 |
| DE | 43 16 366 A1 | 11/1994 |

* cited by examiner

Primary Examiner—Lesley D. Morris
Assistant Examiner—Tony Winner
(74) Attorney, Agent, or Firm—Nixon & Vanderhye P.C.

(57) ABSTRACT

A mini-bicycle includes a one-piece main tube and a head tube section which runs above fixing or locking structure in a side view and is tilted relative to the alignment of the steering tube which runs underneath the fixing or locking structure. A rear assembly brace structure is connected on its one end via a horizontal axle to the seat tube and on its opposite end via the horizontal axle to the main tube. The rear assembly brace structure has an additional axle or articulated axle in its middle area.

22 Claims, 8 Drawing Sheets

BICYCLE

BACKGROUND OF THE INVENTION

The invention relates to a mini-bicycle

For example, the IKO-Corratec 2001 brochure discloses bicycles with the most varied frames and configurations. The different types of bicycles and bicycle frames offer different advantages, depending on the respective specific primary application.

A generic bicycle is known for example from DE 43 16 366 A1. This bicycle is characterized by a multi-part frame which can be telescoped in and out. In the position of use the telescoping frame is extended in order to have enough space between the seat tube support and the handlebar support. By sliding the telescoping frame parts into one another the bicycle can be folded, requiring less stowage space. Furthermore, the head tube rod is made in two parts and can be swivelled back above the steering tube. In the operating position it can be fixed by a fixing means in which the head tube rod is aligned in a direct axial extension to the steering tube. To enable space-saving folding, the seat tube support together with an additional support means which runs obliquely to the rear can for example be pulled out of the main tube or if necessary inserted again. Basically it will be possible to connect the seat tube to the support tube on the frame part with a swivelling capacity, without this being shown or described in greater detail.

A bicycle which is conventional in terms of its size is also known from U.S. Pat. No. 3,979,136 A. This bicycle also has a two-part main tube, the plane of separation between the two main tubes being located shortly in front of the support point of the seat tube brace. The front main tube section can be swivelled around a vertical swivelling axis until it comes to rest parallel to the rear main tube section in the folded-together position. The seat tube support can swivel around a swivelling axis which lies underneath relative to the rear main tube section. The support braces which run obliquely to the rear from the seat tube brace structure can likewise be folded together in a V-shape so that in the folded-together position the seat tube structure comes to rest essentially parallel to the main tube and in doing so the rear wheel projects through the double brace-shaped seat tube structure. The seat is then behind the rear wheel. The front wheel with the steering tube and the head tube can be swivelled jointly to the rear via a horizontal swivel axis which lies forward on the main tube. The head tube is also supported relative to the main tube via a tiltable support tube structure.

A bicycle structure which is made with a multi-part main tube with a front wheel and two rear wheel axles is fundamentally also known from U.S. Pat. No. 4,824,130 A.

Finally, German utility model DE 81 24 880 U1 discloses a folding motor scooter with optionally a gasoline engine or electric motor.

SUMMARY OF THE INVENTION

The object of this invention is to devise, proceeding from the initially mentioned generic prior art, an improved folding bicycle which is especially suitable for towns and cities and can be carried along comparatively easily in the folded state.

The bicycle as claimed in the invention is designed not only to be small, but also be to folded together to be small. It can be easily packed in a motor vehicle or even carried; the wheels are smaller than 12 inches. They can even easily have a size of 7 inches. Therefore the bicycle as claimed in the invention is comparable to so-called roller scooters, therefore known miniscooters which are likewise used to travel quickly in urban areas and can be carried into stores, schools, businesses, government offices, etc.

The bicycle as claimed in the invention is characterized by a main tube which is located comparatively low. In contrast to the generic prior art this main tube is made however, not in two parts or even telescoping, but only in one part. In this way it can be built structurally simply and mainly lighter. There is no conventional bicycle frame.

Furthermore, in the bicycle the upper part of the two-part lead tube (specifically above the separation which joins the two torque tube sections or the tilt axis) is tilted relative to the alignment position of the lower head tube section or steering tube in the forward direction. This makes it possible for enough space to remain for a bicycle rider between the seat and seat tube support and the upper head tube and the handlebar in an overall short design and structural length of the main tube or main tube arrangement.

To be able to easily adjust the bicycle between the unfolded position of use and the folded-up carrying position, the rear assembly brace construction is made such that it is hinged forward on the main tube and trailing on the main tube structure and preferably in the middle area has one axle or articulated axle in order to be able to adjust the rear assembly construction from the position which runs preferably straight in the position of use into the position folded-together in a V shape, in which then the seat tube support is likewise swivelled in the direction of the main tube. In this way completely reliable set-up and folding can be accomplished.

The two-part lead tube preferably has a horizontal tilt axis which is preferably located immediately above the steering tube which ends low. At this point there is also a fixing or clamping means in order to fix the two lead tube sections in the position of use in a fixed relative position to one another.

The rear assembly braces are preferably located in the middle with a hinge so that the head tube and the seat tube can be completely folded away downward in the direction of the low main tube which passes preferably from the steering tube to the dropout. The wheels can be designed to be extremely small, comparable to the initially mentioned miniscooters.

Although the head and seat tube can preferably be folded completely away, it can also be attached removably at least indirectly to the main tube.

Furthermore, it has proven to be favorable for the inner bearing without the inner bearing housing to be screwed directed to the main or frame tube. Since the steering tube is preferably low, similarly to in miniscooters, there is an overly long steering linkage as claimed in the invention. The cranks are made preferably shorter than in a normal bicycle.

For the drive sprocket preferably fewer teeth than in a normal wheel are used. In conventional wheels the chain wheel has at least 11 teeth. In the mini-bicycle as claimed in the invention the number of teeth can be chosen to be much less than 11, so that a chain wheel not only with 10, but even only with 9, 8 or 7 teeth can be easily built.

The mini-bicycle as claimed in the invention preferably does not have gear shifting. It can be provided with a free-wheeling rear wheel or even with a rigid drive so that it can also be ridden backwards. In addition, the mini-bicycle can also be provided with a foot rest in order to be able to place the feet in coasting, especially with a rigid drive. In addition, the foot rests could also project laterally mounted on the rear wheel in order to use the bicycle also as a scooter.

In one alternative and preferably cumulative embodiment, an especially compact bicycle with small dimensions can also be formed by the front part of the main tube between the bottom bracket bearing and the head tube being less than 70% of the rear main tube section between the bottom bracket bearing and the dropout. Preferably the front part of the main section has only half the length of the rear main tube section. The head tube section can be aligned running forward relative to the lower steering tube as compensation.

The invention is detailed below using the drawings.

DETAILED DESCRIPTION OF THE INVENTION

Figure 1:
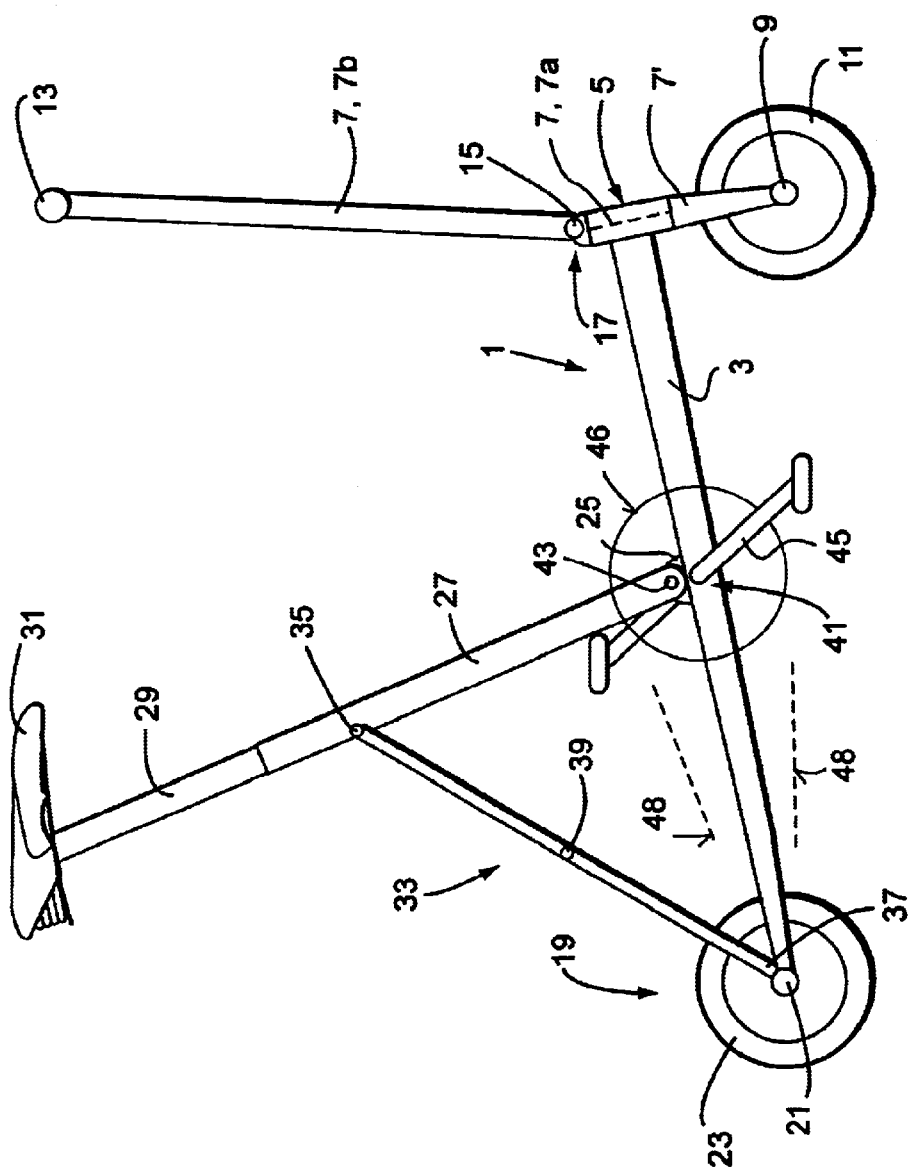
FIG. 1 shows a schematic side view of the mini-bicycle as claimed in the invention.
Figure 2:
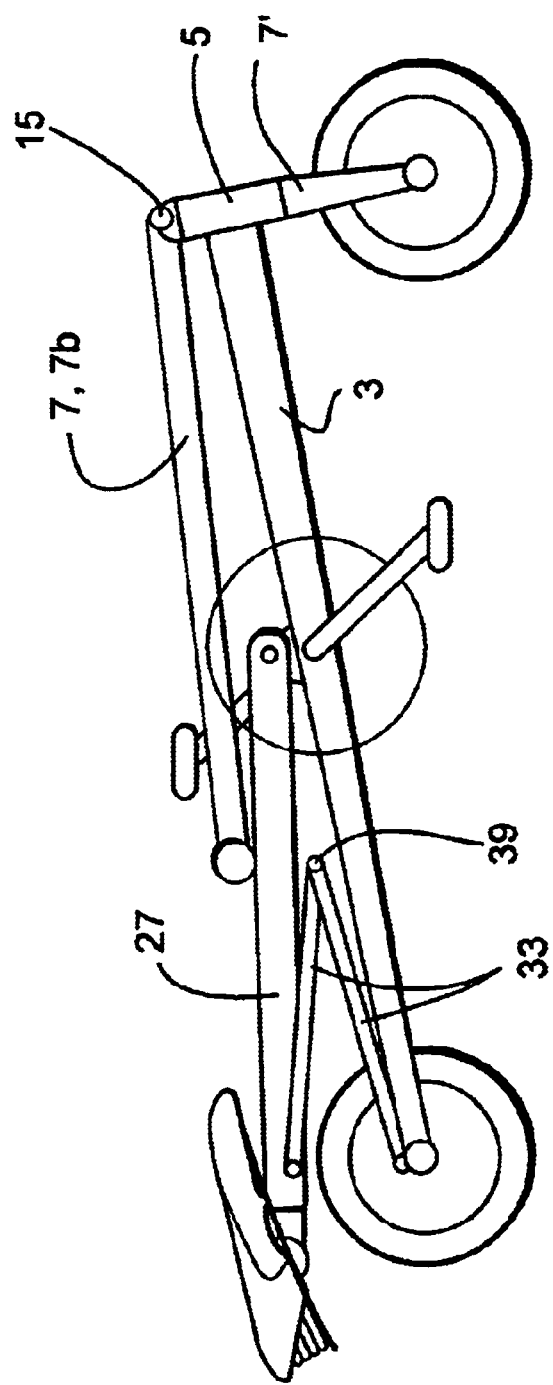
FIG. 2 shows the mini-bicycle as claimed in the invention in the folded-together state.

The mini-bicycle shown in FIGS. 1 and 2 comprises a bicycle frame 1 which consists essentially of a main tube 3 which is permanently joined to the steering tube 5 forward. In the steering tube 5 the head tube 7 is pivotally mounted and underneath the steering tube 5 passes into the head tube fork 7'; on its fork end the front wheel axle 9 of the front wheel 11 is supported.

The drawing shows that the head tube 7 is made in two parts and in addition to the head tube section 7a which is pivotally mounted in the steering tube comprises a second head tube section 7b which is provided with handlebars 13, the two head tube sections 7a and 7b being connected to one another via a tilt axle 15 which is horizontal when riding in a straight line. In this embodiment the tilt axle 15 is located directly above the steering tube 5. In the area of the horizontal tilt axle 15 there is furthermore a stationary or locking means 17, via which the two head tube sections 7a and 7b can be fixed permanently, assigned to one another.

Figure 3:
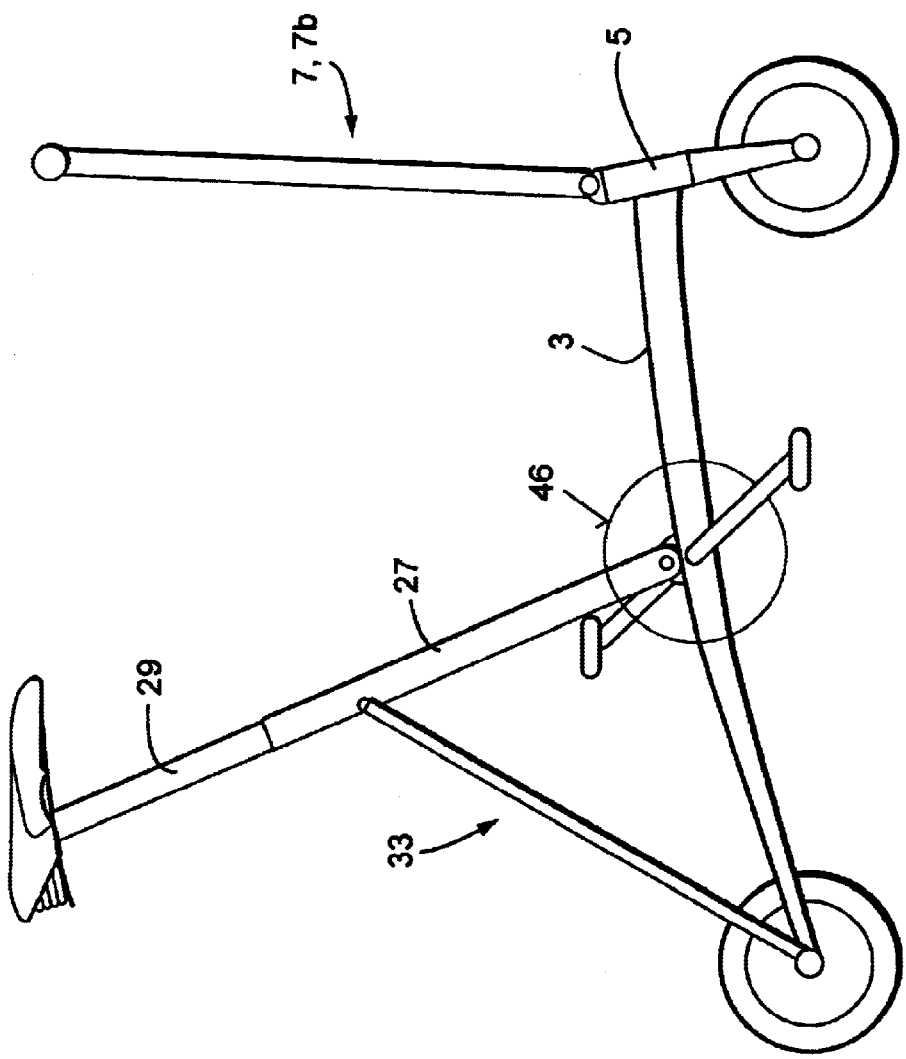
FIG. 3 shows an embodiment slightly modified compared to FIG. 1.

The side view as shown in FIG. 1 and FIG. 3 also shows that, as is common in bicycles, the steering tube and the lower head tube section which is pivotally supported in the steering tube and which then passes into the steering fork, is made to run obliquely from top to bottom at least slightly in the forward direction of travel. Conversely, however, the following upper head tube section 7b is not aligned in the exact axial extension of the lower head tube section or steering tube, but is conversely tilted in the forward direction of travel. In this embodiment the upper head tube section 7b is aligned running forward at least slightly from bottom to top relative to the vertical plane which is aligned transversely to the lengthwise direction of the bicycle. If the vertical plane which runs transversely to the lengthwise direction of the bicycle were to be placed through the horizontal tilt axle 15 which hinges the two head tube sections, the top end of the upper head tube section 7b and thus also the handlebars 13 would come to rest in front of this plane in the direction of travel.

In this embodiment the main tube 3 runs from the steering tube almost straight to the rear dropout 19 where the axle 21 of the rear wheel 23 is supported. In the middle area of the main tube 3 on the swivel projection 25 on the tilt axle 43 there the seat tube 27 is tiltably supported. In the top end of the seat tube 27 the seat support 29 of the seat 31 is anchored with the capacity to be adjusted to different relative heights and thus for example can be locked by an adjustment lever which is not detailed.

Between the seat tube 27 and the main tube 3 there is a rear assembly structure with for example one or two rear assembly braces 33. The rear assembly brace or braces 33 in this embodiment are hinged relative far above to the seat tube, i.e. shortly under its top end, via a horizontal axle 35 provided there and via one on the main tube 3 preferably on the back end of the main tube 3, therefore on the dropout 9 (in this embodiment directly adjacent to the rear wheel axle 21) around another axle 37 on the main tube 3. The rear assembly braces 33 can be made as double rear assembly braces which run at least almost parallel so that the rear wheel 23 can turn freely between them and the main tube 3 which ends in a fork shape around its rear wheel axle 21. Here the rear assembly braces 33 are provided with a middle tilt axle 39 which can be fixed in the position of use, as is apparent from FIG. 1.

Finally, there is another bottom bracket bearing 41 with a bottom bracket bearing housing which in this embodiment is provided roughly in the middle on the main tube 3, therefore at least in the vicinity of the swivelling projection 25 on which the seat tube 27 can be swivelled around the horizontal tilt axle 43.

Figure 10:
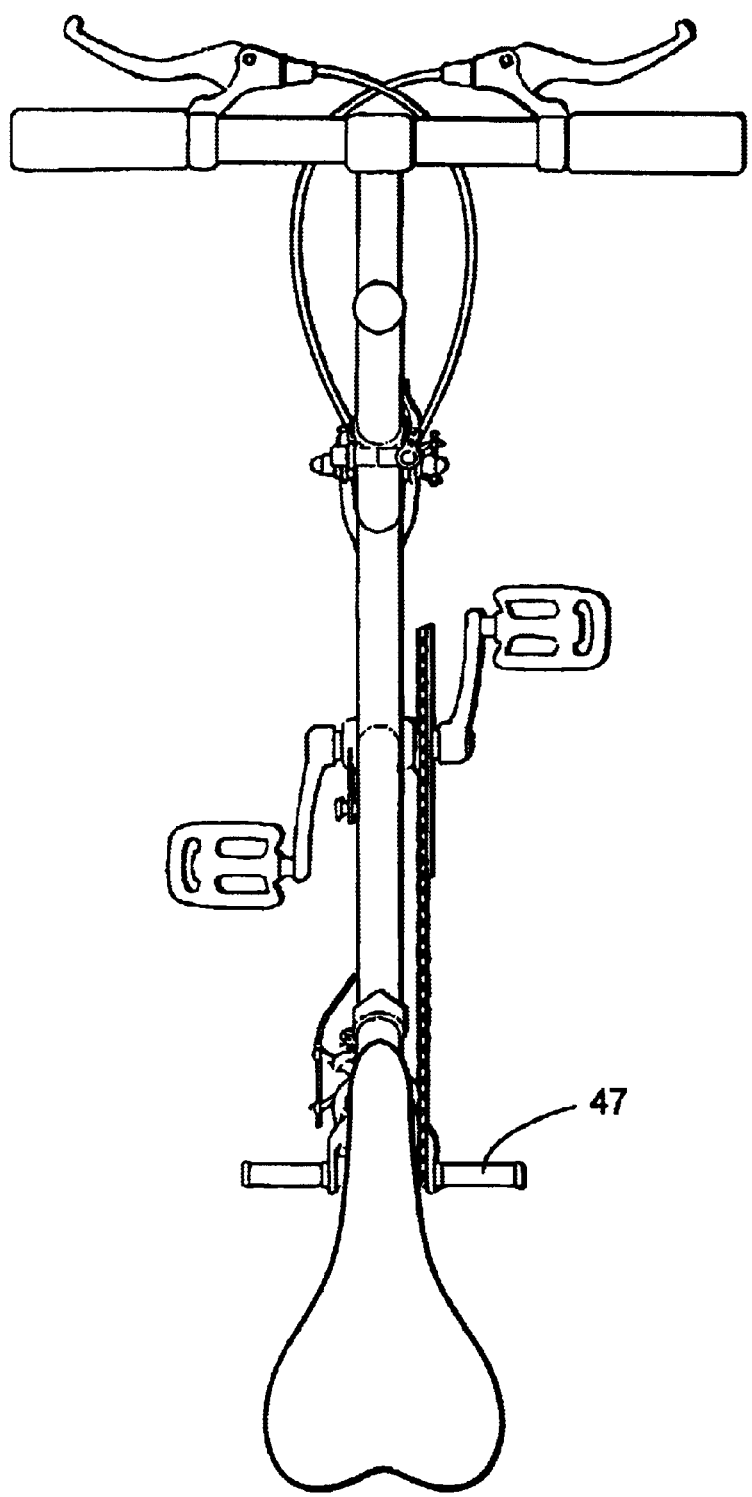
FIGS. 10 and 11 show the bicycle with possible additional foot rests.
Figure 11:
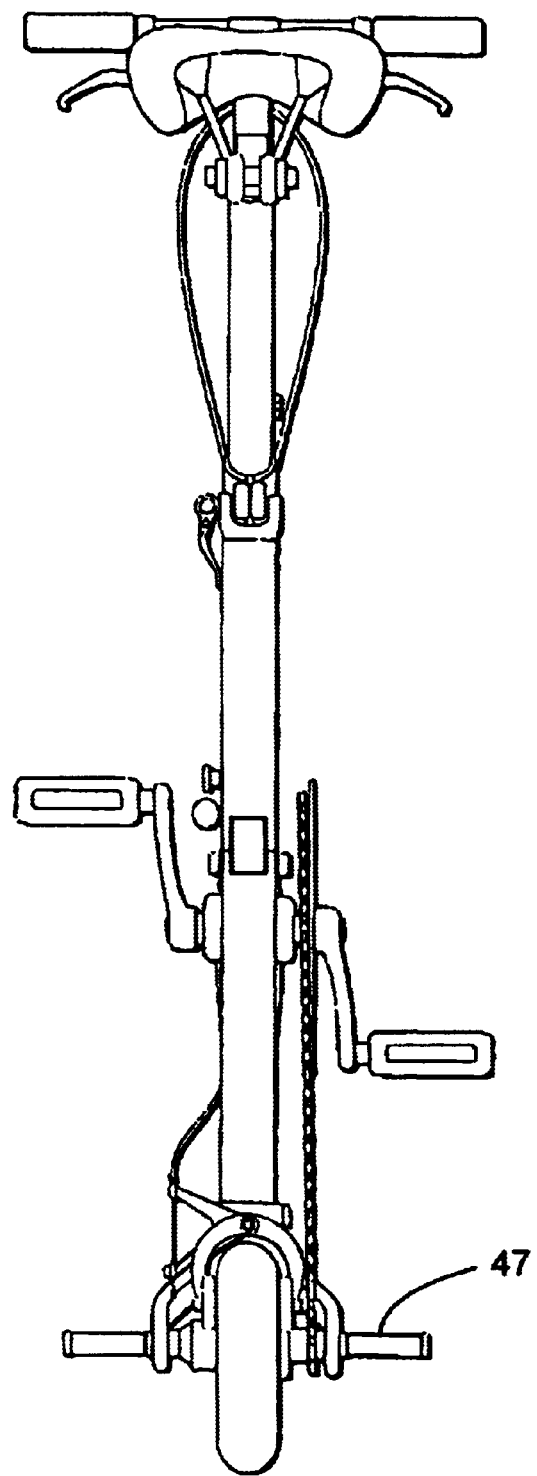

The pedal cranks 45 are made shorter than in a normal bicycle. A drive sprocket which is coupled to the rear wheel 23 has fewer teeth than in a normal wheel. The number of teeth can be 11 or less. In this embodiment preferably one drive sprocket with 7 teeth is used. Preferably the rear wheel 23 is equipped with a free-running hub. But a rigid drive is also possible so that the bicycle can be ridden in the forward and backward direction. The chain 48 which turns between the gear 46 which is coupled to the pedal cranks 45 and the drive sprocket which becomes smaller and which is coupled to the rear wheel 23 (not detailed in FIG. 1) is suggested only in sections in FIG. 1. Possible additional foot rests 47 which can be made for example on the main tube, on the head tube and/or on the rear wheel axle are shown in FIGS. 10 and 11.

In this embodiment therefore the main tube lies low, the tilt axle 15 for the two-part head tube 7 in this embodiment being lower than twice the wheel height.

In order to fold up the bicycle in a space-saving manner, only the fixing or locking means 17 which is not detailed in the area of the front and horizonal tilt axle 15 and another fixing or locking means 19 in the area of the tilt axle 39 of the rear assembly braces 33 need be released in order to fold together the mini-bicycle from the riding and operating position shown in FIG. 1 into the folded-up position shown in FIG. 2.

This capacity to be easily folded up is also achieved by the tilt axle 39 of the rear assembly braces 33 being located in the middle of the braces and moreover the axles 35 and 37 of the rear assembly braces 33 which yield the connection to the seat tube or the dropout together with the horizonal tilt axle 43 of the seat tube 27 forming roughly an equilateral triangle, by which the space-saving folding capacity can be accomplished.

In this embodiment it also happens that moreover the seat 31 can be additionally turned around the seat axis 49 in order to yield a space-saving arrangement in the folded state as shown in FIG. 2. Moreover the seat tube support 39 after releasing a fixing means which is not shown is pushed lower into the seat tube 27 so that in the folded state the seat 31 does not project so far to the rear.

In contrast to the embodiment shown, it is also possible for the rear assembly braces 33 at least in their part nearer the seat tube to be made as a single-tube structure and to be made fork-shaped only in the area which extends around the rear wheel 23.

The main tube need be made fork-shaped only in the immediate region of the rear wheel and can otherwise be made as a single-tube structure. The main tube or the other tubes can have all conventional tube shapes, therefore in cross section need be shaped not only round, but can also be made oval, can have a square cross section, etc. The aforementioned tilt axles are therefore all arranged parallel to one another.

The foldable tilt axles can however also be made as a connecting or unlocking means in order for example to remove the head tube sections 7a which are connected to the handlebar and/or the seat tube 27 from the main tube in order to fold up the mini-bicycle in a space-saving manner. The explained folding mechanism is however preferred.

Finally, on the illustrated handlebars 13 there can also be one or two hand brakes, via which a front wheel brake and/or a rear wheel brake can be actuated. The corresponding cables can be easily laid on the head tube section 7b and then along the main tube 3.

Using FIG. 3, in contrast to FIG. 1, it is shown simply that the main tube 3 can also have another curve shape, in contrast to perfectly straight. In the embodiment shown in FIG. 3 the main tube in a side view is arched slightly convexly upward. This makes it possible to place the bottom bracket bearing housing somewhat higher than in the embodiment shown in FIG. 1. Moreover the main tube can slope more dramatically in the rear area toward the dropout. Here too a change in the cross section from the steering tube to the dropout is also possible, as is shown schematically using FIGS. 1 and 3.

Using FIGS. 4 to 8 a fundamentally identical embodiment of the invention which is however shown in greater detail is explained. The same reference numbers show the same parts or components of the bicycle.

The embodiment shown in FIGS. 4 to 9 shows that for example relative to the total length of the main tube 3 from the rear wheel axle 21 to the steering tube 5 which lies to the front the axle of the bottom bracket bearing 41 is relatively far forward, compared to conventional bicycles. In other words, the distance between the bottom bracket bearing 41 and the bottom bracket bearing axle and the front steering tube 5 is less than 70% of the length from the rear wheel axle 21 to the bottom bracket bearing 41 Preferably this front section relative to the rear section of the main tube 3 is even less than 60%, especially less than 55%, preferably around 50%.

Figure 4:
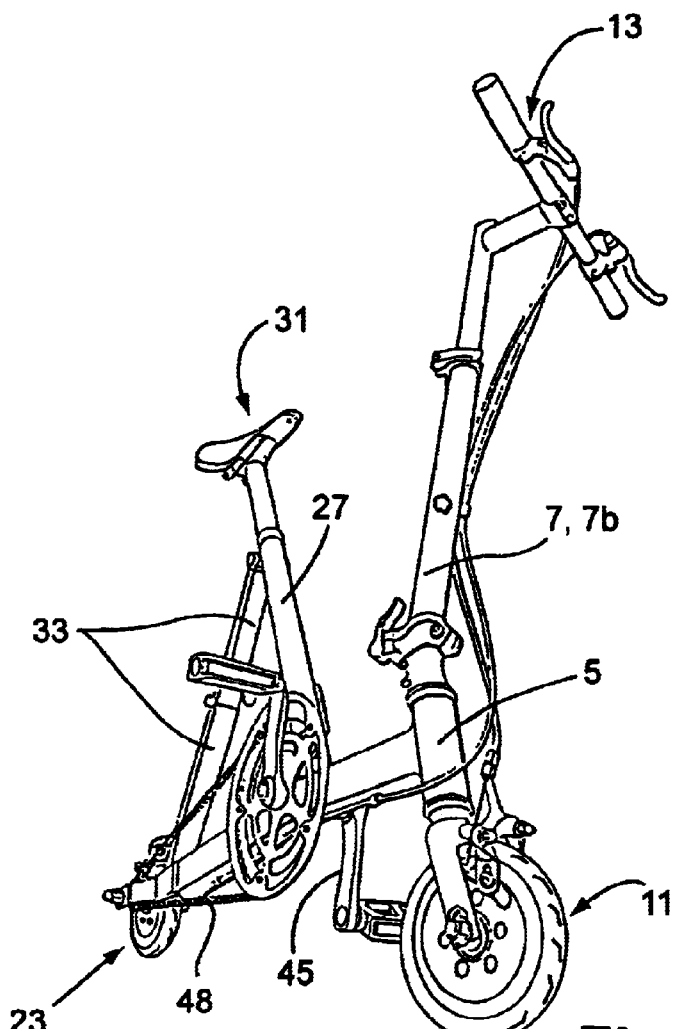
FIG. 4 shows a perspective of a bicycle as claimed in the invention in a larger detailed view.

In the embodiment shown in FIG. 4 following, moreover the rear assembly brace 33 is made of a two brace sections 33 which are hinged to one another but which are each made in one piece and are connected to one another via one axle or hinge connection 39. The two parts of the rear assembly braces 33 which are hinged together in the embodiment shown have a rectangular cross section to ensure high stability. The coupling point which lies underneath, i.e. the axis 37 which lies underneath, establishes the connection to the main tube, this axis lying in front of the rear wheel 23 on a projection which is connected to the main tube 3, so that the two parts of the rear assembly brace 33 which are hinged to one another in their total length are not made as double brace structures or in the area of the rear wheel 23 provided with a fork-shaped split, but are each made running in one piece in their total length. The rectangular or polygonal cross section moreover yields a comparatively wide or long axle 37, by which likewise the stability is again improved.

Moreover, in this embodiment as shown in FIG. 4 following, the main tube 3 in cross section is also made rectangular or with polygonal cross section.

The seat tube 27 can be swivelled directly around an axle 43 which lies above the bottom bracket bearing 41 as explained in the embodiment as shown in FIGS. 1 to 3, this axle 43 likewise being formed again on the fixed projection which is connected to the main tube 3. Above the top end of the actual seat tube the support which is connected to the seat can be pushed in to different heights and then locked accordingly with conventional means. The upper part of the head tube 7 is also made to telescope so that the upper part of the head tube 7 with the handlebars 13 can be adjusted and locked at different heights matched to different requirements.

At least the distance between the lower axis 37 of the rear assembly brace structure and the horizontal adjustment axis 43 of the seat tube on the main tube 3 corresponds to the distance between this axis 43 and the coupling axis 35 which lies overhead and to which the rear assembly brace structure 33 on the seat tube 27 is coupled. The distance between the two aforementioned lengths differs by no more than 20%, preferably less than 10%, especially even less than 5% from one another.

It is apparent according to the embodiment that the length of the main tube 3 is shorter overall than the distance between the seat 31 and the main tube 3, i.e. especially between the seat 31 and the lower axle 43 of the seat tube 27 in the conventional position of use.

Figure 9:
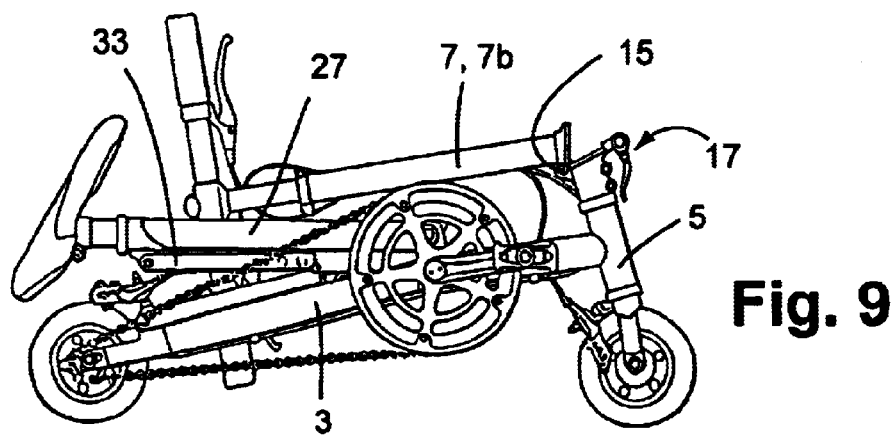
FIG. 9 shows the mini-bicycle of FIG. 4 in the folded-together state.
Figure 5:
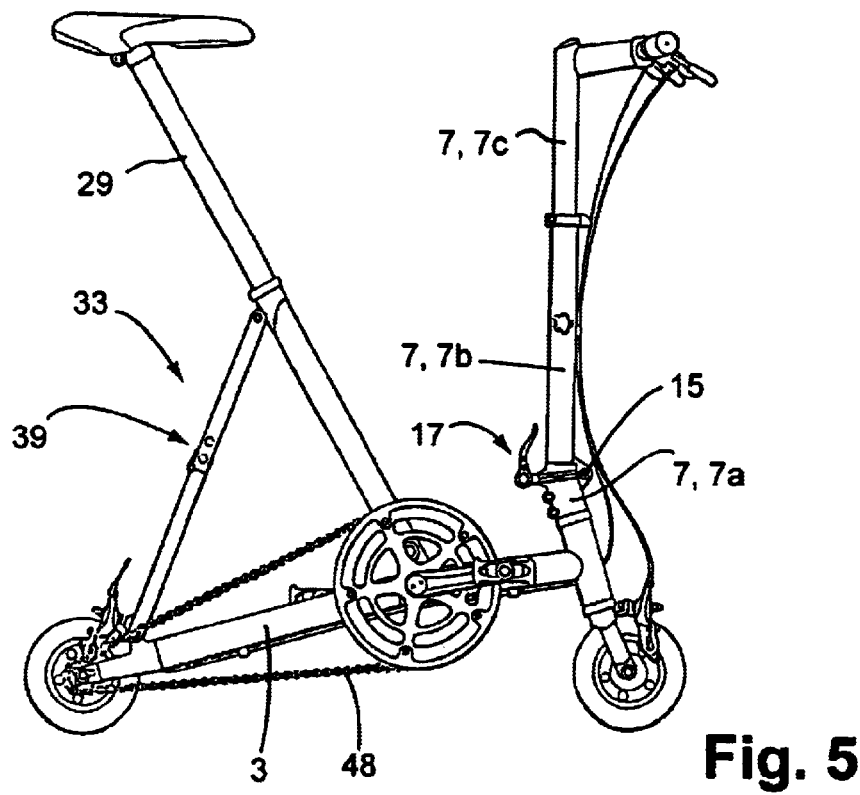
FIG. 5 shows a corresponding first side view of the embodiment shown in FIG. 4.

In the folded state the seat tube support 28 and optionally the seat 31 come to rest directly above the rear wheel 23 as shown in FIG. 9. To achieve a space-saving folding capacity likewise the seat support 29 after opening the corresponding locking closure can be pushed lower into the seat tube 27. Likewise the top part 7c of the head tube 7 (e.g.. FIG. 5) can be pushed lower into the underlying middle part 7b after opening of the locking means. Mainly the handlebars can also be turned by 90° in an overhead view so that they assume the position shown in FIG. 8.

Figure 6:
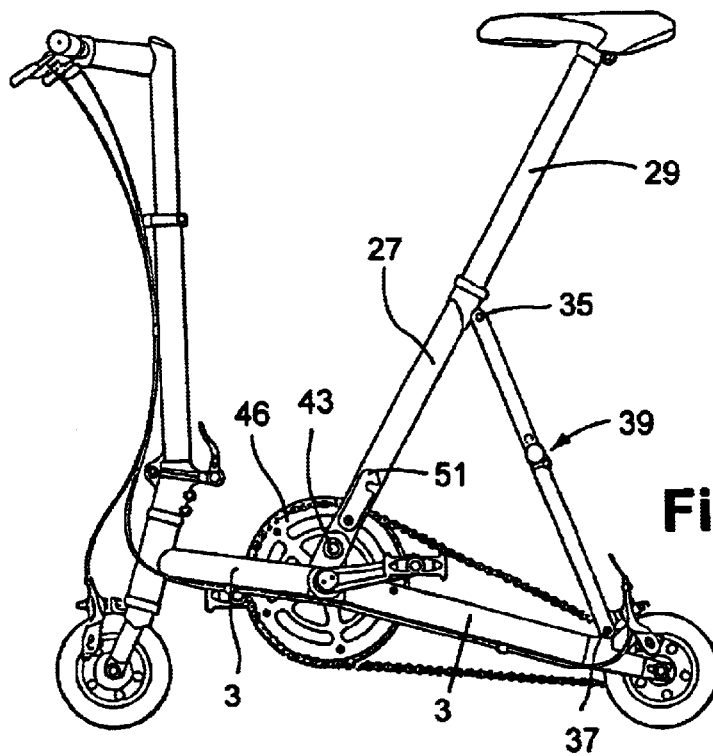
FIG. 6 shows the opposing side view of the bicycle.
Figure 8:
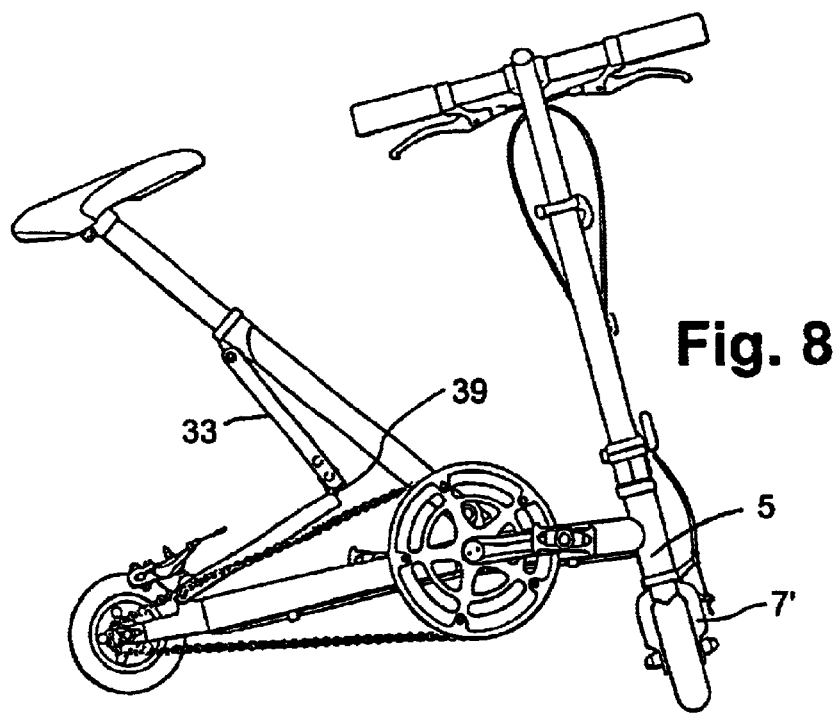
FIG. 8 shows a side view of the bicycle shown in FIGS. 4 to 7 in the folded-together state.
Figure 7:
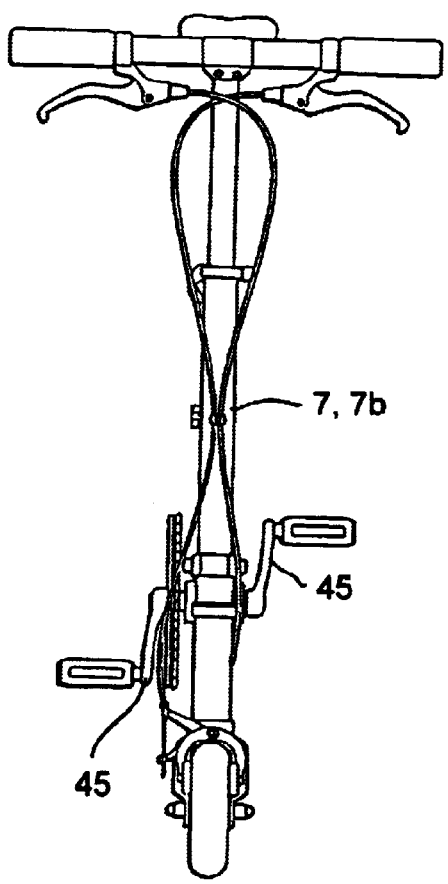
FIG. 7 shows a front view of the bicycle shown in FIGS. 4 to 6.

In this position the locking lever 51 which is shown in FIG. 6 can also be shifted and it extends behind a fixing pin in a slot with the seat tube 27 shifted beforehand so that in the folded state as shown in FIG. 8 the bicycle can be grasped for example on the head tube and can be pushed forward on the rear wheel. In the folded position as shown in FIG. 8 the locking lever 51 ensures that the structure cannot be unintentionally unfolded again.

The explained mini-bicycle is engineered and designed such that it has a center of gravity which is especially low. This makes it possible for the bicycle to be parked only on one pedal without bicycle stands. To do this one pedal at a time must be moved into a position such that it is located in the vicinity of is lowest possible point.

What is claimed is:

1. A mini-bicycle comprising:
   a one-piece main tube which runs from a steering tube to a dropout;
   a head tube pivotally supported in the steering tube, the head tube including a first head tube section which turns in the steering tube and a second head tube section which is located above the steering tube, and the steering tube being obliquely aligned in a side view from top to bottom running in a forward direction,
   wherein the head tube sections are divided into the first and second head tube sections at a first separating point or a first tilt axle above the steering tube, and wherein the first and second head tube sections can be fixed relative to each other in the area of the first separating point by locking means disposed between them;
   a seat tube pivotable around a second separating point or second tilt axle provided in the area of the main tube;
   a rear assembly brace structure which runs between the seat tube and the dropout or the main tube,
   wherein in use, the first and second separating points or the tilt axles between the first and second head tube sections and/or between the seat tube and the main tube are below half a height of the bicycle; and
   wheels having a diameter less than twelve inches,
   wherein the second head tube section in a side view is tilted relative to the alignment of the steering tube such that an upper end of the second head tube section is disposed in front of the locking means, and wherein the rear assembly brace structure is pivotally connected at each end between the seat tube and the main tube, the rear assembly brace structure having an articulated axle in a middle area.

2. Bicycle as claimed in claim 1, wherein a bottom bracket bearing is arranged on the main tube such that the forward distance of the main tube between the bottom bracket bearing and the steering tube is less than 70% of the length of the main tube between the bottom bracket bearing and the rear dropout.

3. Bicycle as claimed in claim 1, wherein the rear assembly brace structure comprises two one-piece brace sections which are connected via one articulated axle.

4. Bicycle as claimed in claim 1, wherein the pivotable connection between the rear assembly brace structure and the main tube is in front of a rear wheel of the wheels.

5. Bicycle as claimed in claim 1, wherein the rear assembly brace structure at least in sections, has a rectangular or n-polygonal cross section or a cross section which approaches this cross sectional shape.

6. Bicycle as claimed in claim 1, wherein the main tube has a rectangular or n-polygonal cross section or at least a cross section which approaches this cross sectional shape.

7. Bicycle as claimed in claim 1, wherein in use, the length of the main tube is shorter than an overall length of the seat tube including a seat support.

8. Bicycle as claimed in claim 1, wherein the head tube has at least two telescoping head tube sections which can be locked on one another, and wherein handlebars coupled with the head tube at least in the folded-together state of the bicycle can be positioned relative to the position of use swivelled by roughly 90°.

9. Bicycle as claimed in claim 1, further comprising a locking lever, wherein the bicycle can be locked in the folded-together state such that it is secured against unintentional opening.

10. Bicycle as claimed in claim 1, wherein the seat tube can be swivelled around the second tilt axle relative to the main tube.

11. Bicycle as claimed in claim 1, wherein a drive sprocket is coupled to a rear wheel of the wheels and has fewer than 11 teeth.

12. Bicycle as claimed in claim 11, wherein the drive sprocket has 7 teeth.

13. Bicycle as claimed in claim 1, further comprising fixing-locking means, via which the articulated axle can be locked between two sections of the rear assembly braces, which sections can be swivelled relative to one another, the fixing-locking means preventing any swivelling.

14. Bicycle as claimed in claim 1, wherein the pivotable connection between the rear assembly brace structure and the seat tube has roughly the same distance from the second separating point as the second separating point has to the pivotable connection between the rear assembly brace structure and the main tube.

15. Bicycle as claimed in claim 1, wherein a rear wheel of the wheels is provided with a free-running hub means.

16. Bicycle as claimed in claim 1, wherein a rear wheel of the wheels is rigidly connected to a revolving chain to enable movement forward and backward.

17. Bicycle as claimed in claim 1, further comprising one or more foot rests in the axial extension to a rear wheel axle.

18. Bicycle as claimed in claim 1, wherein the wheels are smaller than 8 inches.

19. Bicycle as claimed in claim 1, wherein the main tube extends in a distance range of less than 24 inches.

20. Bicycle as claimed in claim 1, wherein the bicycle has a low-lying center of gravity such that the bicycle can be parked resting solely on one pedal itself.

21. A mini-bicycle comprising:
    a one-piece main tube which runs from a steering tube to a dropout;
    a head tube pivotally supported in the steering tube, the head tube including a first head tube section which turns in the steering tube and a second head tube section which is located above the steering tube, and the steering tube being obliquely aligned in a side view from top to bottom running in a forward direction,
    wherein the head tube sections are divided into the first and second head tube sections at a first separating point or a first tilt axle above the steering tube, and wherein the first and second head tube sections can be fixed relative to each other in the area of the first separating point by locking means disposed between them;
    a seat tube pivotable around a second separating point or second tilt axle provided in the area of the main tube,
    wherein in use, the first and second separating points or the tilt axles between the first and second head tube sections and/or between the seat tube and the main tube are below half a height of the bicycle;
    wheels having a diameter less than twelve inches,
    wherein the second head tube section in a side view is tilted relative to the alignment of the steering tube such that an upper end of the second head tube section is disposed in front of the locking means; and
    a bottom bracket bearing attached to the main tube such that the forward distance of the main tube between the bottom bracket bearing and the steering tube is less than 70% of the length of the main tube between the bottom bracket bearing and the rear dropout.

22. Bicycle as claimed in claim 21, wherein the bottom bracket bearing is arranged on the main tube such that a front section of the main tube to a rear section which is formed thereby is roughly 50%.

* * * * *